(12) United States Patent
Musial et al.

(10) Patent No.: US 7,484,689 B2
(45) Date of Patent: Feb. 3, 2009

(54) AVIATION GROUND POWER UNIT CONNECTION SYSTEM AND METHOD INCORPORATING SAME

(75) Inventors: Kurt M. Musial, Valrico, FL (US); John T. Mead, Sarasota, FL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/199,657

(22) Filed: Jul. 19, 2002

(65) Prior Publication Data

US 2004/0011918 A1  Jan. 22, 2004

(51) Int. Cl.
*B64F 1/36* (2006.01)

(52) U.S. Cl. ............... 244/114 R; 244/1 R; 439/34
(58) Field of Classification Search ........... 244/1 R, 244/114 R; 439/34, 338, 341, 534, 28, 11, 439/13
See application file for complete search history.

(56) References Cited

U.S. PATENT DOCUMENTS

| | | | | |
|---|---|---|---|---|
| 4,101,100 A | * | 7/1978 | Smith et al. ............. | 244/114 R |
| 4,850,880 A | * | 7/1989 | Zayat et al. ............. | 439/11 |
| 5,894,393 A | * | 4/1999 | Elliott et al. ............. | 361/42 |
| 5,967,836 A | * | 10/1999 | Bailey ............. | 439/534 |
| 6,332,794 B1 | * | 12/2001 | Tzeng Jeng ............. | 439/188 |
| 6,424,891 B1 | * | 7/2002 | Sargent et al. ............. | 701/29 |
| 6,544,069 B1 | * | 4/2003 | Enriquez et al. ............. | 439/534 |
| 6,709,297 B2 | * | 3/2004 | Lee ............. | 439/638 |
| 2001/0018277 A1 | * | 8/2001 | Gerard et al. ............. | 439/13 |
| 2002/0039846 A1 | * | 4/2002 | Lazaro et al. ............. | 439/34 |
| 2002/0182910 A1 | * | 12/2002 | Kiughadush et al. ............. | 439/171 |

* cited by examiner

*Primary Examiner*—Timothy D Collins
(74) *Attorney, Agent, or Firm*—Fletcher Yoder

(57) ABSTRACT

The present technique provides a system and method for automatically releasing a power connection between an aircraft and a ground power unit. The power connection may have a release mechanism, such as a straight-pull coupling, which disconnects in response to movement of the aircraft or the ground power unit. The release mechanism also may disconnect in response to a critical tension within a power cable of the power connection. The power connection also may have a rotatable mount for the release mechanism, such that the power cable is alignable with tension in the power cable. The present technique also may have a variety of sensors to trigger a power shutdown and automatic release of the power connection.

27 Claims, 3 Drawing Sheets

AVIATION GROUND POWER UNIT CONNECTION SYSTEM AND METHOD INCORPORATING SAME

BACKGROUND OF THE INVENTION

The present technique relates generally to aviation systems, and more particularly, to ground power units. In particular, the present technique provides a system and method for providing power to an aircraft on the ground from a ground power unit using an automatically releasable connector.

A ground power unit (GPU) is often used to supply power to an aircraft on the ground, such as during passenger loading/unloading, servicing, or other ground support operations. The GPU generally comprises an engine driven generator having an integral power cord, which is connectable tightly within a power receptacle at an underside of the aircraft. In instances where the aircraft is moved without disconnecting the GPU, damage may result to the GPU and the aircraft.

Accordingly, a technique is needed for releasably coupling and automatically releasing a power connection between the ground power unit and the aircraft in response to movement of the ground power unit or the aircraft.

SUMMARY OF THE INVENTION

The present technique provides a system and method for automatically releasing a power connection between an aircraft and a ground power unit. The power connection may have a release mechanism, such as a straight-pull coupling, which disconnects in response to movement of the aircraft or the ground power unit. The release mechanism also may disconnect in response to a critical tension within a power cable of the power connection. The power connection also may have a rotatable mount for the release mechanism, such that the power cable is alignable with tension in the power cable. The present technique also may have a variety of sensors to trigger a power shutdown and automatic release of the power connection.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

As discussed in detail below, a system and method is provided for powering an aircraft with a ground power unit having a cable connector assembly, which is automatically releasable from the aircraft in response to an actual or sensed event. For example, the present technique may terminate a power connection between the aircraft and the ground power unit in response to motion of the aircraft or the ground power unit. The foregoing power disconnection proceeds automatically in response to the actual or sensed event, thereby avoiding safety hazards and potential damage to the aircraft and the ground power unit. The automatic disconnect may proceed using a mechanical disconnect mechanism, an electrical-mechanical disconnect mechanism, computer aided control, motion sensors, tension sensors, or any other suitable automatic release mechanism.

Figure 1:
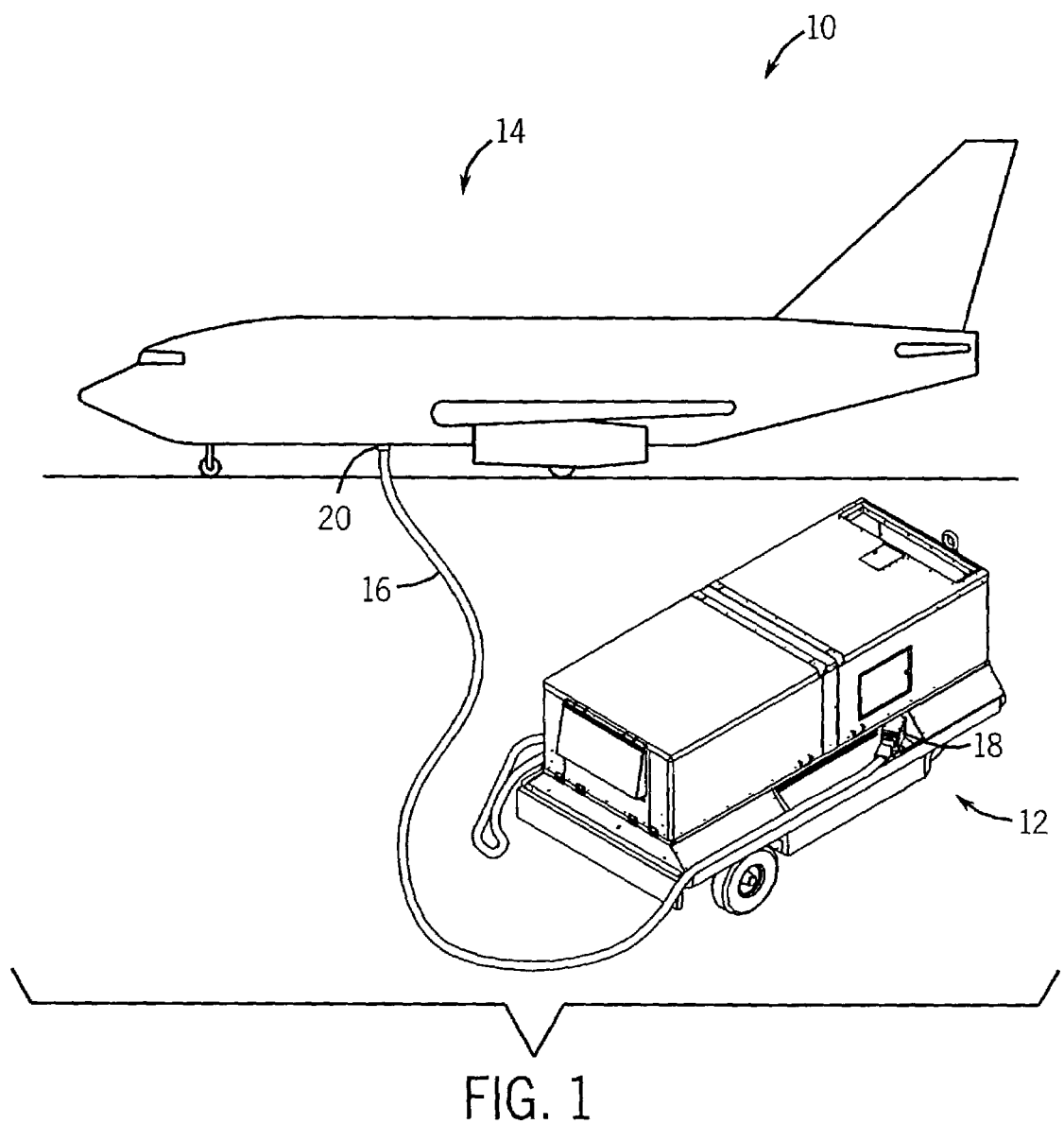
FIG. 1 is a perspective view of an exemplary ground support power system of the present technique.

FIG. 1 illustrates an exemplary ground support power system 10 that provides power from a ground power unit 12 to an aircraft 14, such as a commercial or military aircraft. Although the ground support power system 10 is illustrated as an aviation power system, the present technique is applicable to a wide variety of power support systems and vehicles, such as automotive, marine, and aircraft vehicles. The illustrated ground power unit 12 is a mobile vehicle having an onboard power supply, which provides power to the aircraft 14 through a power cable 16 extending from the ground power unit 12 to the aircraft 14. The power cable 16 is releasably coupleable to the ground power unit 12 and the aircraft 14 at power connector assemblies 18 and 20, respectively. One or both of the power connector assemblies 18 and 20 may incorporate unique aspects of the present technique, as described in further detail below. For example, the power connector assemblies 18 and 20 may be connectable and releasable via a push-pull operation, a twist operation, a lateral sliding motion, or any other suitable connection and release mechanism. Moreover, the power connector assemblies 18 and 20 may be securable via a mechanical latch, an electrical-mechanical catch assembly, or any other suitable securement mechanism. In operation, one or both of the power connector assemblies 18 and 20 may be automatically releasable via motion or tension in the power cable 16, an excessive movement of the ground power unit 12 or the aircraft 14, a critical event sensed in the ground power unit 12 or the aircraft 14, or any other electrical or mechanical trigger.

Figure 2:
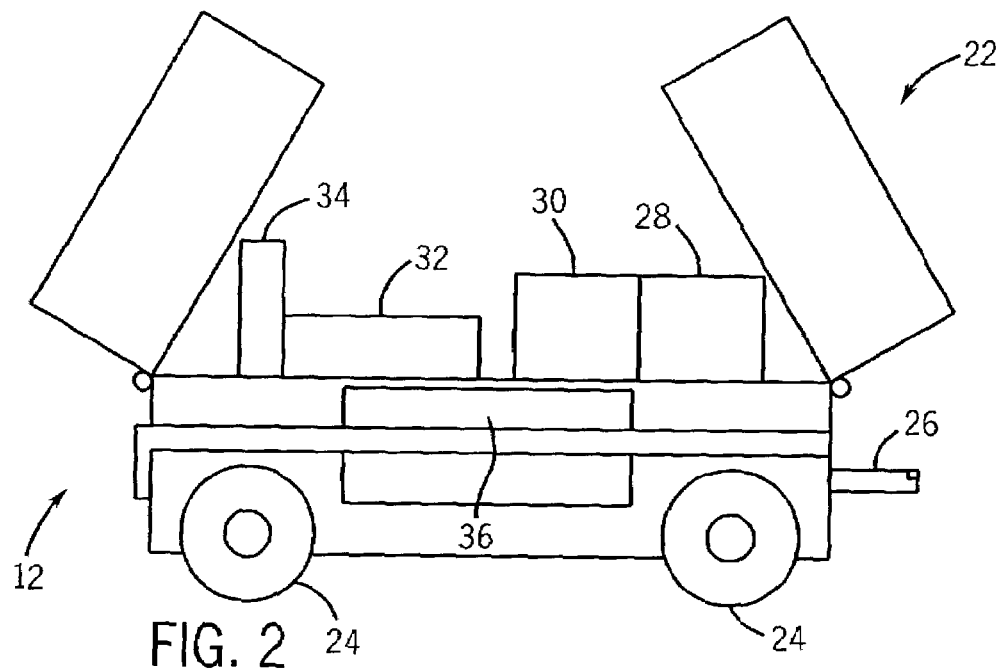
FIG. 2 is a side view of an exemplary ground power unit of the ground support power system illustrated by FIG. 1.

FIG. 2 is a side view of an exemplary embodiment of the ground power unit 12, which may comprise a variety of power sources, mobile or immobile structures, and instrumentation. For example, exemplary power sources comprise battery power, solar power, mechanically generated power, or any other suitable power source. The illustrated ground power unit 12 comprises a clamshell housing 22 and a plurality of wheels 24. The ground power unit 12 also may have a towing connector 26, which may be interlocked with a hitch of a motorized vehicle. Within the clamshell housing 22, the ground power unit 12 has a motor 28, a generator 30 coupled to the motor 28, a fuel tank 32 for the motor 28, and an instrument panel 34 for monitoring and controlling the ground power unit 12. For example, the instrument panel 34 may comprise a variety of sensors, such as motion sensors or power irregularity sensors, for automatically disengaging a power connection between the ground power unit 12 and the aircraft 14. The ground power unit 12 also may have a bay 36 for the power cable 16 and the power connector assembly 18.

Figure 3:
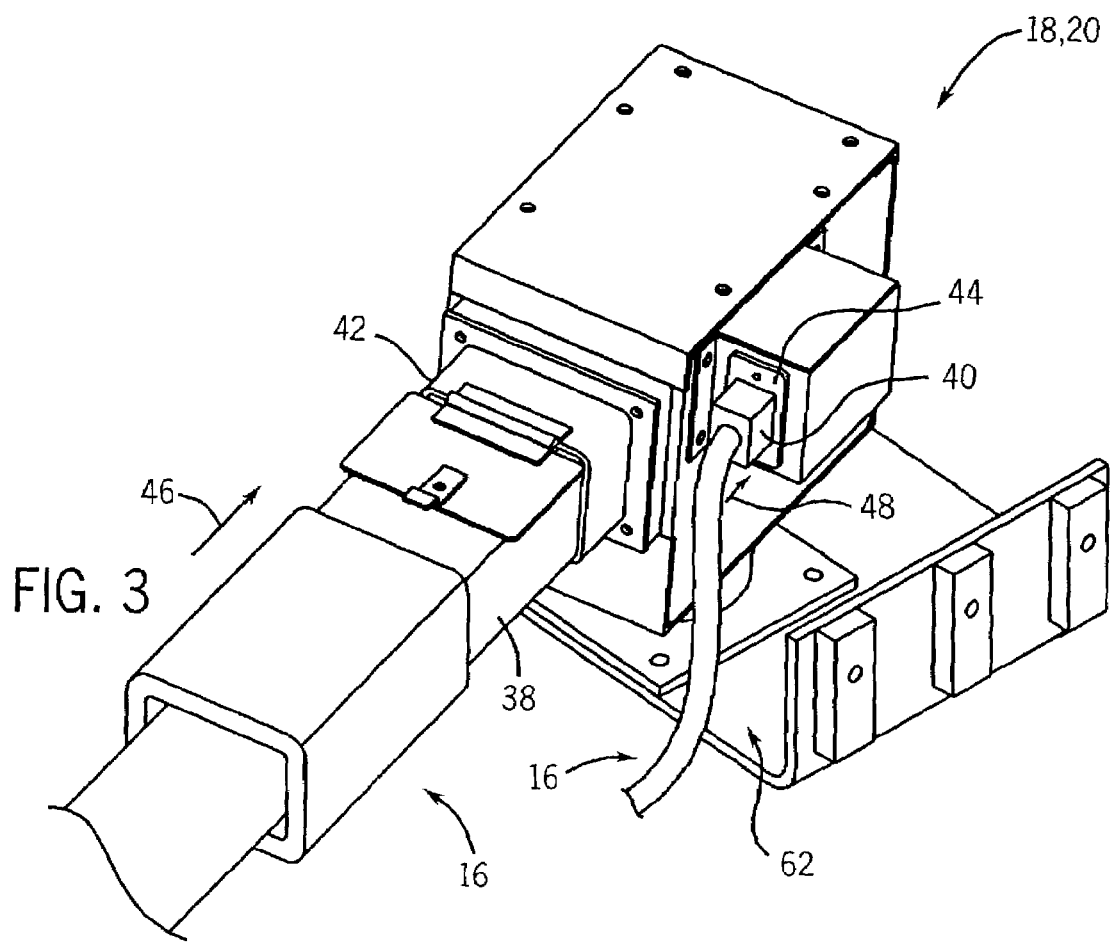
FIGS. 3 and 4 are perspective views of an exemplary power connector assembly of the ground support power system illustrated by FIG. 1.

In operation, the power cable 16 is removed from the bay 36, coupled to the power connector assembly 18, extended to the aircraft 14, and coupled to the power connector assembly 20. FIG. 3 is a perspective view of the power cable 16 coupled to one of the power connector assemblies 18 and 20. Again, one or both of the power connector assemblies 18 and 20 may have the structure illustrated by FIG. 3, while the remaining power connector assembly may have any other suitable coupling mechanism. The present technique also may have a plurality of coupling mechanisms for each power connection between the power cable 16 and the respective power connector assemblies 18 and 20. For example, the power cable 16 illustrated by FIG. 3 has a plurality of insulated conductor assemblies, which terminate at power connector ends 38 and 40. The power connector ends 38 and 40 are separately engageable with connector receptacles 42 and 44, respectively. These separate power connections may be used for distinct power connections, voltage regulation circuitry, or any other electrical connections between the ground power unit 12 and the aircraft 14. The connection status of one or both of the power connector ends 38 and 40 also may control power from the ground power unit 12 to the power cable 16. For example, the ground power unit 12 may supply power to the power cable 16 based on the connection status between the power connector end 38 and the connector receptacle 42. If the power connector end 40 is removed from the connector receptacle 44, such as due to an unexpected movement of the ground power unit 12 or the aircraft 14, then the present technique may cut power to the connector receptacle 42 prior to disengagement with the power connector end 38.

Figure 4:
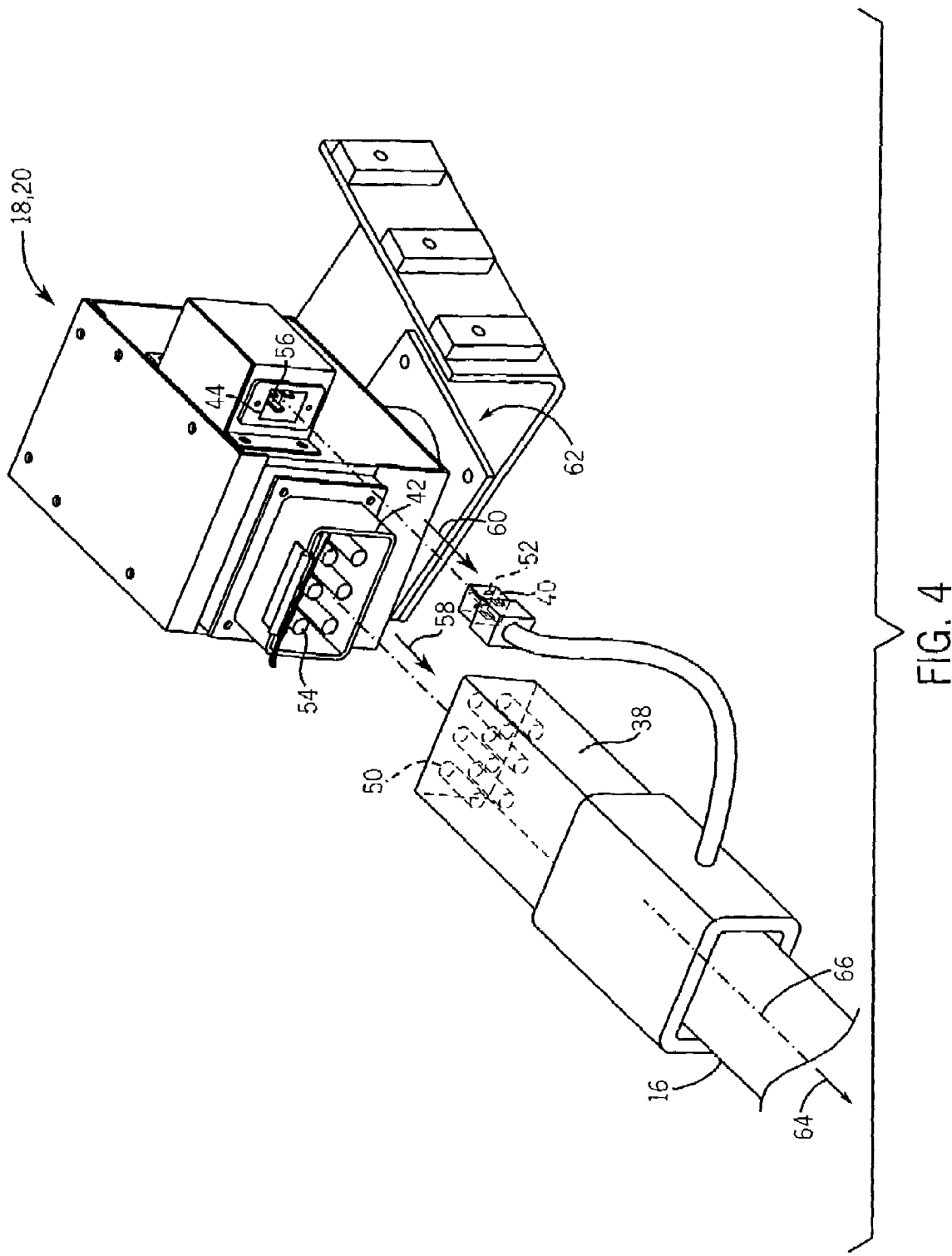

In this exemplary embodiment, the power cable 16 and the power connector assemblies 18 and 20 have a male/female coupling mechanism, such as a straight push-pull connection and release mechanism. For example, the power connector ends 38 and 40 may comprise female electrical connectors 50 and 52, while the connector receptacles 42 and 44 comprise male electrical connectors 54 and 56 for the female electrical connectors 50 and 52, respectively. As indicated by arrows 46 and 48, the power connector ends 38 and 40 are insertable longitudinally straight into the connector receptacles 42 and 44, respectively. Similarly, as illustrated by arrows 58 and 60 of FIG. 4, the power connector ends 38 and 40 are removable longitudinally straight out of the connector receptacles 42 and 44, respectively. If tension builds in the cable 16, such as due to movement of the ground power unit 12 or the aircraft 14, then the power connector ends 38 and 40 are automatically released from the connector receptacles 42 and 44, respectively.

The power connector assemblies 18 and 20 also may have a rotatable mount structure 62. Accordingly, the power connector assemblies 18 and 20 are rotatably responsive to tension 64 in the cable 16, such that the connector receptacles 42 and 44 are alignable with a longitudinal axis 66 of the power cable 16 and with a release mechanism for the power connector ends 38 and 40, respectively. In this exemplary embodiment, the power connector ends 38 and 40 are automatically releasable from the connector receptacles 42 and 44 via a critical tension in the power cable 16. For example, the critical tension may arise from an excessive movement between the ground power unit 12 and the aircraft 14. If personnel attempt to move the ground power unit 12 or the aircraft 14 prior to disconnecting the power cable 16, then one or both of the power connector assemblies 18 and 20 automatically release the power cable 16 to prevent damage to the ground power unit 12 and the aircraft 14. Again, any suitable automatic release mechanism is within the scope of the present technique.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A ground power system for an aircraft, comprising:
a ground power source;
a power cable coupleable with the aircraft and the ground power source, wherein the power cable comprises a main cable and a complementary cable coupled to the main power cable at a connection end portion of the power cable; and
a connector housing, comprising:
a first electrical connector configured to connect with the main cable at the connection end portion of the power cable; and
a second electrical connector separate from the first electrical connector, wherein the second electrical connector is configured to mate with the complementary cable at the connection end portion of the power cable, wherein the connector housing comprises an automatic release having a release direction alignable lengthwise with the power cable, and the automatic release is triggered by sufficient tension in the power cable from motion between the aircraft and the ground power source; and
a rotatable mount coupled to an exterior of the connector housing, wherein the rotatable mount is configured to align the first and second electrical connectors with tension in the power cable.

2. The ground power system of claim 1, wherein the ground power source comprises a power generator.

3. The ground power system of claim 2, wherein the ground power source comprises a motor coupled to the power generator.

4. The ground power system of claim 1, wherein the ground power source comprises a battery.

5. The ground power system of claim 1, comprising a mobile delivery device having the ground power source.

6. The ground power system of claim 5, wherein the mobile delivery device comprises a trailer.

7. The ground power system of claim 6, comprising a motorized vehicle configured to tow the trailer.

8. The ground power system of claim 5, wherein the mobile delivery device comprises a motorized vehicle.

9. The ground power system of claim 1, wherein the rotatable mount is coupled to the ground power source.

10. The ground power system of claim 1, wherein the rotatable mount is coupled to the aircraft.

11. The ground power system of claim 1, wherein the rotatable mount comprises a rotational axis that is perpendicular to the release direction, and the rotatable mount is configured to rotate the entire connector housing.

12. The ground power system of claim 1, wherein the first electrical connector comprises a first push-pull electrical plug, and the second electrical connector comprises a second push-pull electrical plug.

13. The ground power system of claim 1, comprising a power disconnect configured to remove power from the ground power source to the power cable in response to a sensed motion of the aircraft and/or the ground power source, a sensed mechanical disconnect, or a sensed tension, or a combination thereof.

14. The ground power system of claim 13, wherein the power disconnect is configured to remove power from the ground power source to the power cable in response to the sensed motion of the aircraft and/or the ground power source.

15. The ground power system of claim 13, wherein the power disconnect is configured to remove power from the ground power source to the power cable in response to the sensed mechanical disconnect.

16. The ground power system of claim 13, wherein the power disconnect is configured to remove power from the ground power source to the power cable in response to the sensed tension.

17. The ground power system of claim 1, wherein the ground power source comprises a clamshell housing.

18. The ground power system of claim 1, wherein the ground power source comprises a base having a plurality of wheels, a first top cover rotatably coupled to the base, and a second top cover rotatably coupled to the base.

19. The ground power system of claim 18, wherein the first and second top covers rotate open in diverging directions relative to one another, and the first and second top covers rotate closed in converging directions relative to one another.

20. The ground power system of claim 1, wherein the ground power source comprises a storage bay configured to store the power cable.

21. The ground power system of claim 20, wherein the storage bay comprises the connector housing and the rotatable mount.

22. The ground power system of claim 1, wherein the ground power source is configured to supply power through the power cable based on a connection status of the power cable.

23. The ground power system of claim 22, wherein the connection status of one or both of the main cable and the complementary cable is configured to control power from the ground power source to the power cable.

24. The ground power system of claim 1, comprising a plurality of ground power sources, including the ground power source, configured to provide power to a plurality of aircraft.

25. The ground power system of claim 1, comprising a facility or site including the ground power source.

26. The ground power system of claim 1, comprising one or more motion sensors configured to trigger an automatic removal of power between the ground power source and the aircraft.

27. The ground power system of claim 1, comprising one or morn power irregularity sensors configured to trigger an automatic removal of power between the ground power and the aircraft

* * * * *